(12) United States Patent
Jin

(10) Patent No.: US 11,502,931 B1
(45) Date of Patent: Nov. 15, 2022

(54) REMOTE CONTROL SOLUTION SERVER THAT INTEGRATES AND MANAGES IOT DEVICE AND 5G/LTE WIRELESS ROUTER

(71) Applicant: MEXUS INC., Seoul (KR)

(72) Inventor: Yong Su Jin, Seoul (KR)

(73) Assignee: MEXUS INC., Seoul (KR)

( * ) Notice: Subject to any disclaimer, the term of this patent is extended or adjusted under 35 U.S.C. 154(b) by 0 days.

(21) Appl. No.: 17/725,680

(22) Filed: Apr. 21, 2022

(30) Foreign Application Priority Data

Apr. 27, 2021 (KR) ......................... 10-2021-0054290

(51) Int. Cl.
*H04L 43/18* (2022.01)
*H04L 69/08* (2022.01)
*H04L 43/0876* (2022.01)

(52) U.S. Cl.
CPC .......... *H04L 43/18* (2013.01); *H04L 43/0876* (2013.01); *H04L 69/08* (2013.01)

(58) Field of Classification Search
CPC ...... H04L 43/18; H04L 43/0876; H04L 69/08
USPC ....................................................... 709/224
See application file for complete search history.

(56) References Cited

U.S. PATENT DOCUMENTS

2017/0105131 A1\* 4/2017 Song ........................ H04W 4/80
2017/0187602 A1\* 6/2017 Pathela ............... G06F 11/0751
2018/0063079 A1\* 3/2018 Ding ................... H04L 63/0464

FOREIGN PATENT DOCUMENTS

| CN | 112637283 A | \* | 4/2021 |
| KR | 1020110026239 A | | 3/2011 |
| KR | 1020180089082 A | | 8/2018 |
| KR | 101965352 B1 | | 4/2019 |
| KR | 101992303 B1 | | 6/2019 |
| KR | 20210105447 A | \* | 8/2021 |

\* cited by examiner

*Primary Examiner* — James E Springer
(74) *Attorney, Agent, or Firm* — Dinsmore & Shohl LLP; Yongsok Choi, Esq.

(57) ABSTRACT

A remote control solution server for integrally managing an Internet of things device and a router is provided. The server an integrated management unit connected to the router through a network. The integrated management unit includes a first monitor configured to collect first state information data generated by the router to check a state of the router, a second monitor configured to collect second state information data from the Internet of things device connected to the router through the network, and a third monitor configured to collect measurement information data from a sensor module connected to the Internet of things device through the network.

5 Claims, 3 Drawing Sheets

REMOTE CONTROL SOLUTION SERVER THAT INTEGRATES AND MANAGES IOT DEVICE AND 5G/LTE WIRELESS ROUTER

CROSS-REFERENCE TO RELATED APPLICATIONS

The present application claims priority under 35 U.S.C 119(a) to Korean Patent Application No. 10-2021-0054290 filed on Apr. 27, 2021, which is incorporated herein by reference in its entirety.

BACKGROUND

1. Field of the Invention

The present disclosure relates to a remote control solution server.

2. Description of the Related Art

In general, a router provides a network to various devices. One of the devices is an Internet of things (IoT) device. The IoT device may be controlled by a user terminal through the network.

The router that provides the network is monitored by a control server. The control server collects state information data from the router and analyzes the state information data to determine a communication state of the router.

According to a related art, a router is separated from a server for monitoring an IoT device. The router is managed by a control server, and the IoT device is managed by a monitoring server.

The separate management gives trouble to a person in charge of managing the router and the IoT device. When there is a communication failure between the router and the IoT device, the person in charge has to separately check the respective servers.

In addition, the separate management requires a separate server and an additional network. The separate server and the additional network impose a burden of management cost on a manager. In addition, a complex network makes it difficult to solve an issue when an accident such as a communication failure occurs. This is because a network size required to analyze the cause of failure increases.

Accordingly, the inventor of the present disclosure provides the present disclosure by researching for a long time and developing through trial and error in order to solve the above issues.

SUMMARY

An object of the present disclosure is to provide a remote control solution server that may integrally manage an Internet of things (IoT) device, a sensor module, and a router.

Another object of the present disclosure is to provide a remote control solution server that minimizes sizes of networks between a router, an IoT device, and a sense module.

The technical issue to be solved by the present disclosure is not limited to the above-described technical issues, and other technical issues not described above will be clearly understood by those skilled in the art to which the present disclosure belongs from the following description.

According to an aspect of the present disclosure to solve the above issues, a remote control solution server for integrally managing an Internet of things device and a router may include an integrated management unit connected to the router through a network, wherein the integrated management unit may include a first monitor configured to collect first state information data generated by the router to check a state of the router, a second monitor configured to collect second state information data from the Internet of things device connected to the router through the network, and a third monitor configured to collect measurement information data from a sensor module connected to the Internet of things device through the network, the third monitor may collect the measurement information data through the router, and the integrated management unit may minimize networks required for monitoring by integrally collecting the first and second state information data and the measurement information data from the router.

In addition, in the present disclosure, the remote control solution server may further include a router register configured to store information on at least one router, a security management unit configured to store an identifier corresponding to the at least one router, and a connection permission unit configured to provide a connection authentication process to the at least one router, wherein, when receiving the identifier corresponding to the router from the Internet of things device, the connection permission unit may permit the router to be connected to the Internet of things device through the network.

In addition, in the present disclosure, the remote control solution server may further include an operation controller configured to transmit a control signal to the Internet of things device through the router to control an operation of the Internet of things device, and a fourth monitor configured to select only an Internet of things device to which the control signal is transmitted and collect third state information data from the selected Internet of things device, wherein the fourth monitor may collect the third state information data in a shorter cycle than a cycle of the second monitor.

In addition, in the present disclosure, the remote control solution server may further include an event generator configured to generate event information when data collected from at least one of the first to third monitors is in a setting range, wherein the event generator may divide the setting range into a first section and a second section and classify the event information into first event information corresponding to the first section and second event information corresponding to the second section, and the event generator may transmit a notification signal to a manager terminal when the second event information is generated.

In addition, in the present disclosure, the remote control solution server may further include a protocol analyzer configured to compare a protocol of data collected from the Internet of things device with a protocol of the router and analyze the protocols, and a protocol converter configured to convert the data of the Internet of things device to be matched with the protocol of the router when a protocol of the Internet of things device is different from the protocol of the router.

In addition, in the present disclosure, the remote control solution server may further include a traffic detector configured to detect traffic of the router and calculate the amount of traffic as a numerical value, and a reboot unit configured to reboot the router to stabilize the network, wherein the reboot unit may detect a certain amount of traffic for a set time and reboot the router when detecting a change in the number of connections of the Internet of things device to the router.

According to the present disclosure, there is an effect that a remote control solution server capable of integrally managing a router and an IoT device may be provided.

In addition, the present disclosure may monitor states of a router and an IoT device in real time. Furthermore, the present disclosure may collect, through a sensor module, measurement information data for an external factor such as an environment of a region where the router and the IoT device are installed and may analyze even external situations of the router and the IoT device.

In addition, the present disclosure may have versatility such as connection to various IoT devices having different protocols through a network.

In addition, according to the present disclosure, a system may be stabilized by selectively performing enhanced monitoring on an IoT device that transmits a control signal. Furthermore, traffic overload may be reduced by stabilizing a network.

In addition, according to the present disclosure, a router may be prevented from failing by rebooting the router when a factor assumed to be a communication failure is detected.

Although not explicitly described herein, effects expected by the technical features of the present disclosure may be treated as described in the specification of the present disclosure.

The accompanying drawings are exemplified as a reference for understanding of the technical idea of the present disclosure, and the scope of the present disclosure is not limited thereby.

DETAILED DESCRIPTION

When those skilled in the art determines that a known function related to the present disclosure is self-evident and may unnecessarily obscure the gist of the present disclosure, detailed descriptions thereof are omitted. Hereinafter, description is made in detail with reference to the accompanying drawings.

Figure 1:
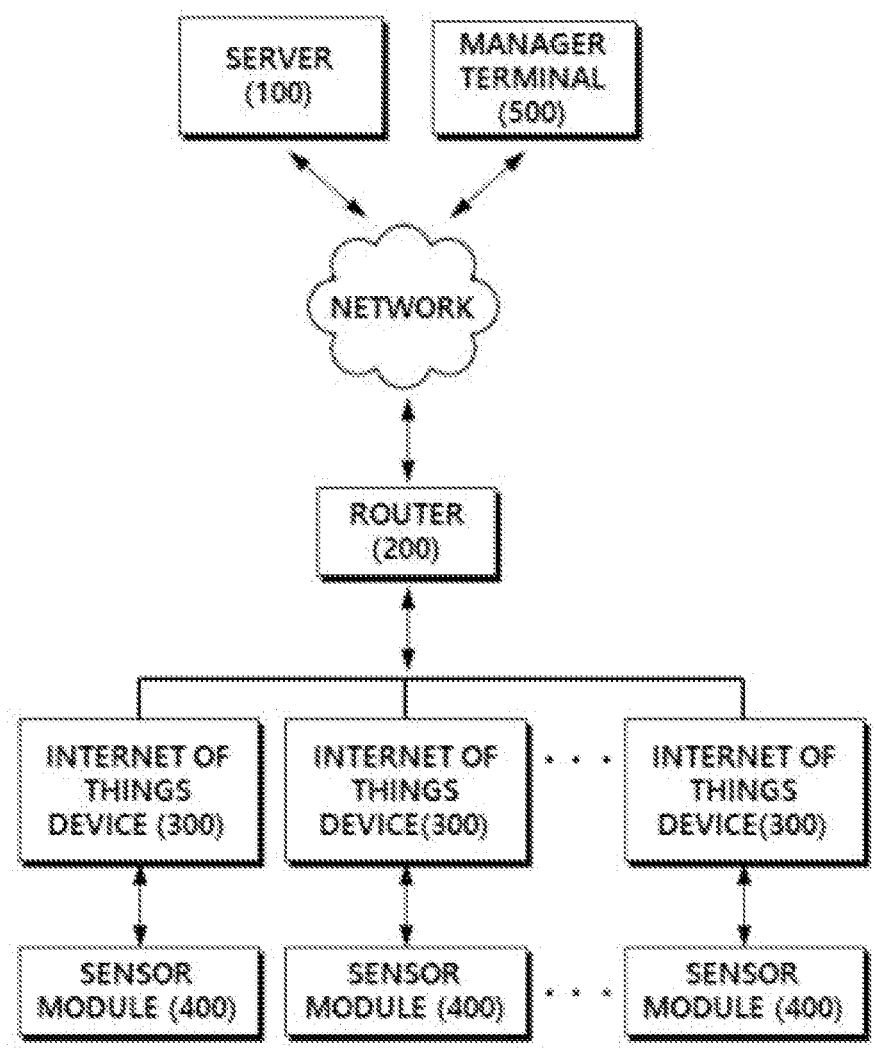
FIG. 1 is a diagram illustrating a system including a remote control solution server.

FIG. 1 is a diagram illustrating a system including a remote control solution server 100. As can be seen from FIG. 1, the remote control solution server 100 is connected to a router 200 through a network, and the router 200 is connected to a plurality of Internet of things (IoT) devices 300 and a plurality of sensor modules 400 through networks. The remote control solution server 100 collects data of the plurality of IoT devices 300 and the plurality of sensor modules 400 through the router 200.

Figure 2:
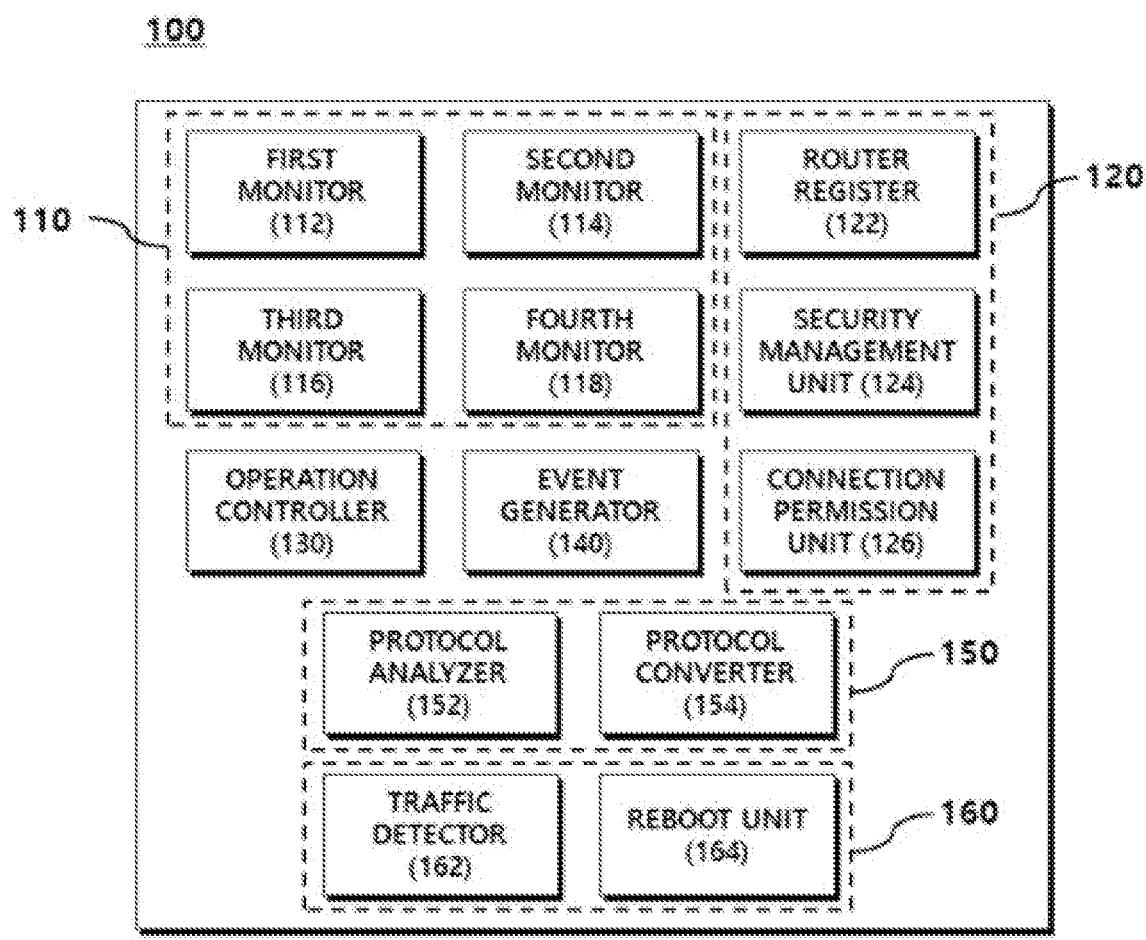
FIG. 2 is a configuration diagram of a remote control solution server according to the present disclosure.

FIG. 2 is a configuration diagram of the remote control solution server 100 according to the present disclosure. As can be seen from FIG. 2, the remote control solution server 100 includes an integrated management unit 110, an authenticator 120, an operation controller 130, an event generator 140, a protocol processor 150, and a resetting unit 160. The remote control solution server 100 may include a memory, and each of the integrated management unit 110, the authenticator 120, the event generator 140, the protocol processor 150, and the resetting unit 160 may be a program module stored in the memory executable by the operation controller 130.

The integrated management unit 110 is connected to the router 200 through a network and receives various types of data from the router 200. The integrated management unit 110 integrally collects first and second state information data and measurement information data from the router 200. Accordingly, the integrated management unit 110 minimizes networks required for monitoring the router 200, the plurality of IoT devices 300, and the plurality of sensor modules 400. The integrated management unit 110 includes a first monitor 112, a second monitor 114, a third monitor 116, and a fourth monitor 118.

The first monitor 112 checks a state of the router 200 by collecting the first state information data generated by the router 200 at a set period. Here, the state information data includes information on a communication state or a power state of a corresponding device. The state information data to be described below also includes information on a communication state or a power state.

The second monitor 114 collects the second state information data from the plurality of IoT devices 300 connected to the router 200 through a network at a set period. The second monitor 114 collects the second state information data through the router 200.

Specifically, the second monitor 114 may collect the second state information data by using any one of a one-way communication collecting method and a two-way communication collecting method.

The one-way communication collecting method is a method by which the plurality of IoT devices 300 independently transmit the second state information data to the router 200. The plurality of IoT devices 300 are directly connected to the router 200 and are connected to the remote control solution server 100 through a network. The plurality of IoT devices 300 are connected to the router 200 through an internet protocol (IP) and port information of the router 200, and thus, setting convenience is guaranteed. This is because the plurality of IoT devices 300 may maintain connection to the router 200 without depending on an IP and port information of the remote control solution server 100.

When the plurality of IoT devices 300 transmit the second state information data to the router 200, the router 200 transmits the second state information data together with the first state information data to the remote control solution server 100. When the router 200 is a wireless router that is driven by a wireless communication method, limitation of a wireless network environment that a network environment is limited may be reduced by performing periodic simultaneous transmission of the first state information data and the second state information data. This is because the periodic simultaneous transmission may dramatically reduce the amount of data use in a wireless network environment.

In addition, the router 200 receiving the second state information data from the plurality of IoT devices 300 may extract only data required for the remote control solution server 100 to display on a screen and transmit the data to the remote control solution server 100. Accordingly, load of the remote control solution server 100 may be reduced. However, a subject for extracting data required for screen display is not limited to the router 200, and thus, the router 200 may also transmit the first and second state information data to the remote control solution server 100, and the remote control solution server 100 may also extract data required for the screen display from the first and second state information data. The remote control solution server 100 displays states of the router 200 and the plurality of IoT devices 300 on a screen by using the extracted data.

The two-way communication collecting method is a method by which the remote control solution server 100 transmits a command to the plurality of IoT devices 300 through the router 200, and the plurality of IoT devices 300 transmit the second state information data to the remote control solution server 100 through the router 200 in response to the command. The router 200 receiving the command from the remote control solution server 100 transmits the command to the plurality of IoT devices 300, and the plurality of IoT devices 300 transmit the second state information data to the router 200 in response to the command. In addition, the router 200 transmits the second state information data to the remote control solution server 100. The second state information data may also be collected by a subjective control of the remote control solution server 100 by using a two-way communication collecting method. To this end, the remote control solution server 100 may transmit a command for collecting the second state information data to the plurality of IoT devices 300 by direct command input. In addition, a command may also be transmitted by using a preset command table, and thus, a user's control convenience may be increased.

The two-way communication collecting method and the one-way communication collecting method differ depending on where a subject performing transmission of the second state information data is located, and thus, the two-way communication collecting method and the one-way communication collecting method are the same as each other except for the difference in a process of collecting the second state information data. Accordingly, the two-way communication collecting method is also the same as the one-way communication collecting method with respect to the periodic simultaneous transmission of the first and second state information data and the subject of data extraction required for screen display. The third monitor 116 collects measurement information data from the plurality of sensor modules 400 connected through networks to the plurality of IoT devices 300 at a set period. The plurality of sensor modules 400 may measure targets to generate measurement information data and may include, for example, a temperature sensor, a fine dust sensor, a store visitor counting sensor, and so on. The third monitor 116 collects measurement information data through the plurality of IoT devices 300 and the router 200.

The third monitor 116 may also collect measurement information data by using any one of the one-way communication collecting method and the two-way communication collecting method in a similar manner to the second monitor 114. Detailed descriptions thereof are omitted to avoid redundancy. The fourth monitor 118 is described below.

The authenticator 120 includes a router register 122, a security management unit 124, and a connection permission unit 126.

The router register 122 stores information on at least one router 200. That is, a unique number of the router 200 and a location associated with the router 200 are stored.

The security management unit 124 stores an identifier corresponding to the router 200. The identifier is information used for data transmission/reception, and for example, universal unique identifier (UUID)/Key may correspond thereto. The security management unit 124 stores the identifier in association with router information.

The connection permission unit 126 provides a connection authentication process to the router. When receiving an identifier corresponding to the router 200 from any one of the plurality of IoT devices 300, the connection permission unit 126 permits network connection between the plurality of IoT devices 300 and the router 200. Accordingly, the plurality of IoT devices 300 may access the router 200.

The operation controller 130 transmits a control signal to the plurality of IoT devices 300 through the router 200. The operation controller 130 may be a processor or CPU. The plurality of IoT devices 300 operate in response to the control signal. For example, when the plurality of IoT devices 300 are closed circuit televisions (CCTVs), the operation controller 130 may transmit the control signal for an imaging angle to the CCTVs to change an imaging place.

In addition, the operation controller 130 may also transmit the control signal to the plurality of IoT devices 300 in response to the collected measurement information data. When the measurement information data that is collected for a set time maintains a set value, the operation controller 130 may transmit the set control signal to the plurality of IoT devices 300 through the router 200. For example, in a case in which the plurality of sensor modules 400 are visitor counting sensors, when a visitor counting value for about 1 hour is 0, the operation controller 130 transmits a control signal including set coordinates to a CCTV. The CCTV which images a blind spot is changed to image an entrance door. The CCTV may perform an automatic security function while access is controlled.

The fourth monitor 118 collects third state information data from the selected IoT device 300 among the plurality of IoT devices 300. The selected IoT device 300 refers to the IoT device 300 received a control signal. The fourth monitor 118 collects the third state information data in a shorter cycle than a cycle of the second monitor 114. This is to selectively enhance monitoring of the IoT device 300 received the control signal. Accordingly, the IoT devices 300 that do not receive the control signal do not perform network transmission and reception, and thus, a reduction in overall network speed may be prevented. In addition, a collection cycle of the fourth monitor 118 may also be set such that the remote control solution server 100 simultaneously collects the second state information data and the third state information data. For example, the collection cycle of the fourth monitor 118 may be set such that, when the third state information data is collected twice while the second state information data is collected once for a preset time, one of the two collection processes of the third state information data is performed by the remote control solution server 100 at the same time as the second state information data. When the router 200 is a wireless router, limitation of a network environment may be reduced. Accordingly, it is possible to minimize the amount of data use in a communication process.

The event generator 140 generates event information when the data collected from at least one of the first monitor 112 to the third monitor 116 is in a setting range. The setting range is divided into a first section and a second section. In response to this, the event information is classified into first event information corresponding to the first section and second event information corresponding to the second section. When the second event information is generated, the event generator 140 transmits a notification signal to a manager terminal 500.

For example, when the plurality of sensor modules 400 are temperature sensors, the third monitor 116 collects temperature information data of an indoor region where the temperature sensors are installed. With respect to a setting range for temperature, the first section may be set to 30 degrees to 40 degrees, and the second section may be set to 40 degrees or more. When the temperature of the indoor region is 40 degrees or more, the event generator 140 transmits a notification signal to the manager terminal 500.

Accordingly, it is possible to prevent a communication failure accident between the router 200 and the plurality of IoT devices 300.

The protocol processor 150 includes a protocol analyzer 152 and a protocol converter 154.

The protocol analyzer 152 analyzes protocols of data collected from the plurality of IoT devices 300. In addition, the protocol analyzer 152 compares the protocols of the data with a protocol of the router 200 and analyses the protocols.

When protocols of the plurality of IoT devices 300 are different from the protocol of the router 200, the protocol converter 154 processes data of the plurality of IoT devices 300 to be matched with the protocol of the router 200. The protocol converter 154 generates conversion data as a processed result. Accordingly, the router 200 may be connected to various types of IoT devices 300 through networks to have versatility.

The resetting unit 160 includes a traffic detector 162 and a reboot unit 164.

The traffic detector 162 detects traffic of the router 200 and calculates the amount of traffic as a numerical value.

The reboot unit 164 reboots the router 200 to stabilize a network. The reboot unit 164 reboots the router 200 when detecting a certain amount of traffic for a set time and detecting a change in the number of connections of the plurality of IoT devices 300 to the router 200. This is because the change in the number of connections of the plurality of IoT devices 300 to the router 200 changes the amount of traffic of the router 200. When the amount of traffic of the router 200 does not change even through the number of connections of the plurality of IoT devices 300 changes, it may be estimated that there is a communication failure. Long-term occurrence of communication failure leads to a failure of the router 200, and the communication failure is solved by rebooting the router 200.

Figure 3:
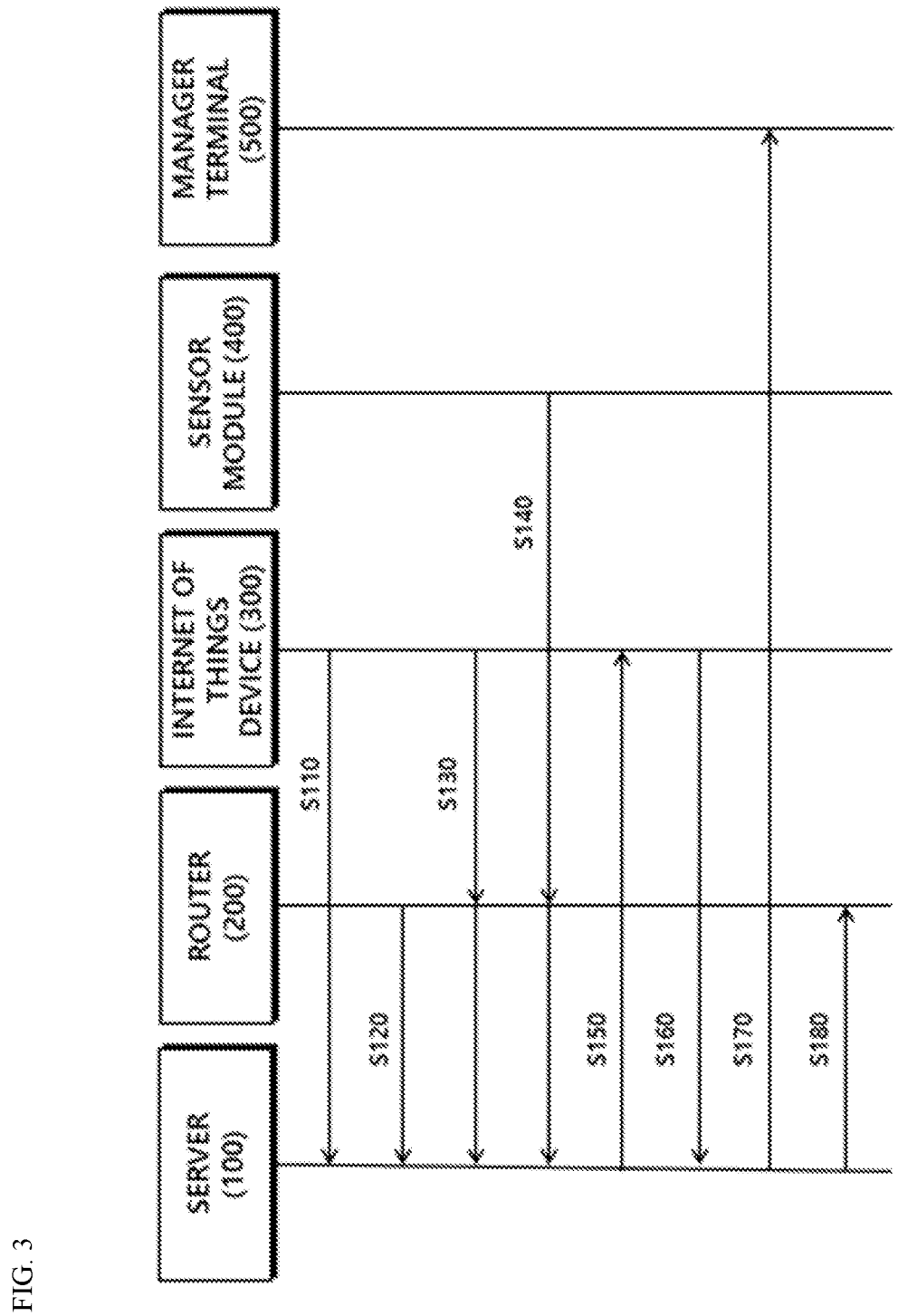
FIG. 3 is a flowchart illustrating an operation flow of a system including a remote control solution server.

FIG. 3 is a flowchart illustrating an operation flow of a system including the remote control solution server 100. In describing the operation flow of the system, portions overlapped with the previous description are briefly described.

As can be seen from FIG. 3, the remote control solution server 100 receives an identifier from the plurality of IoT devices 300 through the router 200 (S110). The remote control solution server 100 compares the received identifier with an identifier corresponding to the router 200. When both identifiers are the same, the remote control solution server 100 allows the plurality of IoT devices 300 to access a network.

The remote control solution server 100 collects first state information data from the router 200 (S120). The remote control solution server 100 collects second state information data from the connected IoT device 300 (S130). Furthermore, the remote control solution server 100 collects measurement information data from the sensor module 400 connected to the IoT device 300 through the network (S140).

If necessary, the remote control solution server 100 may transmit a control signal to the IoT device 300 according to an input of a manager to operate the IoT device 300 (S150). In addition, the remote control solution server 100 selectively receives third state information data in a short cycle from the IoT device 300 to which the control signal is transmitted (S160).

When the collected state information data is in a setting range, the remote control solution server 100 generates event information and transmits a notification signal to the manager terminal 500 (S170).

When detecting a change in the number of connections of the IoT device 300 to the router 200 while detecting a certain amount of traffic, the remote control solution server 100 reboots the router 200 (S180).

It is apparent to those skilled in the art that the present disclosure may be embodied in other specific forms without departing from the characteristics of the present disclosure. Accordingly, the above detailed description should not be construed as restrictive in all respects but as illustrative. The scope of the present disclosure should be determined by a reasonable interpretation of the appended claims, and all modifications within the equivalent scope of the present disclosure are included in the scope of the present disclosure.

What is claimed is:

1. A remote control solution server for integrally managing an Internet of things device and a router, comprising;
    an integrated management unit connected to the router through a network,
    wherein the integrated management unit comprises a first monitor configured to collect first state information data generated by the router to check a state of the router, a second monitor configured to collect second state information data from the Internet of things device connected to the router through the network, and a third monitor configured to collect measurement information data from a sensor module connected to the Internet of things device through the network,
    the third monitor collects the measurement information data through the router, and
    the integrated management unit minimizes networks required for monitoring by integrally collecting the first and second state information data and the measurement information data from the router,
    wherein the remote control solution server further comprises:
    an operation controller configured to transmit a control signal to the Internet of things device through the router to control an operation of the Internet of things device; and
    a fourth monitor configured to select only an Internet of things device to which the control signal is transmitted and collect third state information data from the selected Internet of things device, and
    wherein the fourth monitor collects the third state information data in a shorter cycle than a cycle of the second monitor.

2. The remote control solution server of claim 1, further comprising:
    a router register configured to store information on at least one router;
    a security management unit configured to store an identifier corresponding to the at least one router; and
    a connection permission unit configured to provide a connection authentication process to the at least one router,
    wherein, when receiving the identifier corresponding to the router from the Internet of things device, the connection permission unit permits the router to be connected to the Internet of things device through the network.

3. The remote control solution server of claim 1, further comprising:
    a protocol analyzer configured to compare a protocol of data collected from the Internet of things device with a protocol of the router and analyze the protocols; and
    a protocol converter configured to convert the data of the Internet of things device to be matched with the protocol of the router when a protocol of the Internet of things device is different from the protocol of the router.

4. A remote control solution server for integrally managing an Internet of things device and a router, comprising:
an integrated management unit connected to the router through a network,
wherein the integrated management unit comprises a first monitor configured to collect first state information data generated by the router to check a state of the router, a second monitor configured to collect second state information data from the Internet of things device connected to the router through the network, and a third monitor configured to collect measurement information data from a sensor module connected to the Internet of things device through the network,
the third monitor collects the measurement information data through the router, and
the integrated management unit minimizes networks required for monitoring by integrally collecting the first and second state information data and the measurement information data from the router,
wherein the remote control solution server further comprises:
an event generator configured to generate event information when data collected from at least one of the first to third monitors is in a setting range, and
wherein the event generator divides the setting range into a first section and a second section and classifies the event information into first event information corresponding to the first section and second event information corresponding to the second section, and
the event generator transmits a notification signal to a manager terminal when the second event information is generated.

5. A remote control solution server for integrally managing an Internet of things device and a router, comprising:
an integrated management unit connected to the router through a network,
wherein the integrated management unit comprises a first monitor configured to collect first state information data generated by the router to check a state of the router, a second monitor configured to collect second state information data from the Internet of things device connected to the router through the network, and a third monitor configured to collect measurement information data from a sensor module connected to the Internet of things device through the network,
the third monitor collects the measurement information data through the router, and
the integrated management unit minimizes networks required for monitoring by integrally collecting the first and second state information data and the measurement information data from the router,
wherein the remote control solution server further comprises:
a traffic detector configured to detect traffic of the router and calculate an amount of traffic as a numerical value; and
a reboot unit configured to reboot the router to stabilize the network, and
wherein the reboot unit detects a certain amount of traffic for a set time and reboots the router when detecting a change in a number of connections of the Internet of things device to the router.

\* \* \* \* \*